United States Patent
Ueda et al.

(10) Patent No.: US 7,498,097 B2
(45) Date of Patent: Mar. 3, 2009

(54) FUEL CELL AND PRODUCTION METHOD THEREOF

(75) Inventors: Hideyuki Ueda, Ibaraki (JP); Takashi Akiyama, Suita (JP); Kohji Yuasa, Hirakata (JP); Yukihiro Okada, Katano (JP); Satoshi Shibutani, Hirakata (JP)

(73) Assignee: Panasonic Corporation, Osaka (JP)

( * ) Notice: Subject to any disclaimer, the term of this patent is extended or adjusted under 35 U.S.C. 154(b) by 820 days.

(21) Appl. No.: 11/019,031

(22) Filed: Dec. 22, 2004

(65) Prior Publication Data

US 2005/0142433 A1    Jun. 30, 2005

(30) Foreign Application Priority Data

Dec. 25, 2003    (JP)    ............... 2003-429473

(51) Int. Cl.
*H01M 4/90*    (2006.01)
*H01M 4/88*    (2006.01)
*B05D 5/12*    (2006.01)

(52) U.S. Cl. .................... 429/42; 427/115; 502/101
(58) Field of Classification Search .................. 429/42, 429/45; 502/101; 427/115
See application file for complete search history.

(56) References Cited

U.S. PATENT DOCUMENTS

| | | | | | |
|---|---|---|---|---|---|
| 4,861,622 | A | * | 8/1989 | Yamazaki et al. | ............ 427/582 |
| 5,672,438 | A | * | 9/1997 | Banerjee et al. | ........... 429/42 X |
| 6,040,077 | A | * | 3/2000 | Debe et al. | ................ 429/42 X |
| 6,309,772 | B1 | * | 10/2001 | Zuber et al. | ................ 429/44 X |
| 6,391,487 | B1 | * | 5/2002 | Totsuka | ...................... 429/44 X |
| 6,933,067 | B2 | * | 8/2005 | Kawahara et al. | ......... 429/42 X |

FOREIGN PATENT DOCUMENTS

| | | |
|---|---|---|
| JP | 10-40936 | 2/1998 |
| JP | 2002-231265 | 8/2002 |

* cited by examiner

*Primary Examiner*—Stephen J. Kalafut
(74) *Attorney, Agent, or Firm*—McDermott Will & Emery LLP

(57) ABSTRACT

In order to prevent the crossover of an organic fuel such as methanol in a fuel cell and to exhibit excellent electricity generation characteristics without impairing the utilization efficiency of the fuel, at least either of (1) a discontinuous catalyst layer being formed on a surface of an anode catalyst layer and having a higher density (existence probability) of platinum type catalyst than the anode catalyst layer and (2) an electrolyte polymer layer is formed at the interface between the anode catalyst layer and a polymer electrolyte membrane.

14 Claims, 3 Drawing Sheets

FUEL CELL AND PRODUCTION METHOD THEREOF

BACKGROUND OF THE INVENTION

The present invention relates to a polymer electrolyte fuel cell that generates electricity using a fuel and an oxidant.

As portable compact electronic devices such as cell phones, personal digital assistants (PDAs), notebook computers and camcorders become multifunctional and consume more electric power, they are required to have more electric power and longer continuous operating time. In order to meet this requirement, batteries having a higher energy density are in strong demand as power sources. Currently, lithium secondary batteries are mainly used as high energy density batteries. They are expected to have an energy density of about 500 Wh/L, 200 Wh/kg in around 2005, which is considered to be the limit of the energy density of lithium secondary batteries. Under the circumstances, early commercialization of polymer electrolyte fuel cells (PEFCs) is awaited as an alternative to lithium secondary batteries.

Among PEFCs, active research and development is carried out particularly on direct type fuel cells, which generate electricity by supplying, instead of hydrogen obtained by reforming an organic fuel such as methanol or dimethyl ether, the organic fuel directly to a fuel cell. This is because direct type fuel cells have a high theoretical energy density and a relatively simple system structure. Additionally, organic fuels such as methanol and dimethyl ether are easier to store than hydrogen.

A direct type fuel cell as described above typically includes membrane an electrode assemblies (MEA) and separators. The MEA includes a hydrogen ion conductive polymer electrolyte membrane and a pair of catalyst layers and a pair of diffusion layers arranged on both sides of the polymer electrolyte membrane. Electricity is generated by supplying water and an organic fuel such as methanol or dimethyl ether directly to an anode (fuel electrode) and an oxidant such as oxygen or air to a cathode (air electrode). Chemically speaking, the supplied organic fuel such as methanol or dimethyl ether reacts with water in the anode to produce carbon dioxide, hydrogen ions (protons) and electrons. The protons migrate through the polymer electrolyte membrane to the cathode. Meanwhile, in the cathode, oxygen, protons and electrons traveling through an external circuit combine to produce water.

In order to realize the commercialization of direct fuel cells, however, the phenomenon commonly referred to as "crossover" must be overcome in which the organic fuel such as methanol supplied to the anode passes through the polymer electrolyte membrane to the cathode, without reacting. The most widely used polymer electrolyte membrane for direct type fuel cells is perfluoroalkyl sulfonic acid ion exchange membrane having proton conductivity, heat resistance and oxidation resistance. The polymer electrolyte constituting a polymer electrolyte membrane of this type includes a main chain of polytetrafluoroethylene (PTFE), which is hydrophobic, and a side chain of a perfluoro group having hydrophilic sulfonic acid group fixed at the terminal of the perfluoro group. Accordingly, an organic fuel such as methanol having both hydrophilic and hydrophobic parts is a suitable solvent because the organic fuel easily passes through the polymer electrolyte membrane.

The crossover described above not only decreases the fuel utilization efficiency but also causes the catalytic activity of cathode to decrease and an increase in overvoltage at the cathode, resulting in significant degradation of electricity generation characteristics.

In order to suppress such crossover, Japanese Laid-Open Patent Publication No. 2002-231265 discloses to place a palladium membrane or a palladium alloy membrane having proton diffusibility and proton permeability on one surface of either anode or cathode. It also discloses to place the same between two polymer electrolyte membranes. Japanese Laid-Open Patent Publication No. Hei 10-40936 discloses a direct type fuel cell in which an oxidation catalyst layer for catalytic combustion of methanol is sandwiched between two polymer electrolyte membranes.

It is, however, still difficult for the direct type fuel cell having the structure disclosed in Japanese Laid-Open Patent Publication No. 2002-231265 to exhibit excellent electricity generation characteristics without impairing the fuel utilization efficiency. The palladium membrane or the palladium alloy membrane described above prevents the supplied organic fuel such as methanol from passing through the polymer electrolyte membrane. Since, however, the membrane has a high resistance, the proton conductivity is significantly reduced and the electricity generation characteristics at the higher current density side are lowered.

In the case where an oxidation catalyst layer is sandwiched between two polymer electrolyte membranes as disclosed in Japanese Laid-Open Patent Publication No. Hei 10-40936, the permeation of methanol to the cathode can be prevented, but the amount of methanol which contributes for electricity generation at the anode is reduced, resulting in reduced fuel utilization efficiency. Moreover, carbon dioxide produced by catalytic combustion cannot be removed to the outside, and therefore the amount of fuel supplied to the anode, i.e. the rate for supplying fuel to the anode, is limited, resulting in significant degradation of electricity generation characteristics.

In addition to the above, micro defects usually exist in catalyst layers, and the organic fuel supplied to the anode such as methanol passes through the defects and reaches directly to the polymer electrolyte membrane, without reacting. As a result, the amount of organic fuel that crosses over the polymer electrolyte membrane is increased, reducing the fuel utilization efficiency to cause an increase in overvoltage at the cathode. This results in significantly degraded electricity generation characteristics.

In view of the foregoing, the present invention is intended to solve the problems described above. Accordingly, the objects of the present invention are to prevent the crossover of organic fuel such as methanol and to provide a direct fuel cell having excellent electricity generation characteristics without impairing the fuel utilization efficiency.

BRIEF SUMMARY OF THE INVENTION

In order to solve the above problems, the present invention provides a fuel cell for generating electricity using a fuel and an oxidant comprising:

a hydrogen ion conductive polymer electrolyte membrane;

an anode including an anode catalyst layer located on one surface of the polymer electrolyte membrane, and an anode diffusion layer located on the outer surface of the anode catalyst layer; and a cathode including cathode catalyst layer located on the other surface of the polymer electrolyte membrane, and a cathode diffusion layer located on the outer surface of the cathode catalyst layer, wherein the anode catalyst layer includes conductive carbon particles supporting a platinum type catalyst thereon and a hydrogen ion conductive polymer electrolyte, and at least either of (1) a discontinuous catalyst layer being formed on a surface of the anode catalyst layer and having a higher density of platinum type catalyst than the anode catalyst layer and (2) an electrolyte polymer layer is formed at the interface between the anode catalyst layer and the polymer electrolyte membrane.

While the novel features of the invention are set forth particularly in the appended claims, the invention, both as to organization and content, will be better understood and appreciated, along with other objects and features thereof, from the following detailed description taken in conjunction with the drawings.

DETAILED DESCRIPTION OF THE INVENTION

The present invention relates to a fuel cell the for generating electricity using a fuel and an oxidant comprising:

a hydrogen ion conductive polymer electrolyte membrane; an anode including an anode catalyst layer located on one surface of the polymer electrolyte membrane, and an anode diffusion layer located on the outer surface of the anode catalyst layer; and a cathode including a cathode catalyst layer located on the other surface of the polymer electrolyte membrane, and a cathode diffusion layer located on the outer surface of the cathode catalyst layer, wherein the anode catalyst layer includes conductive carbon particles supporting a platinum catalyst thereon and a hydrogen ion conductive polymer electrolyte, and at least either of (1) a discontinuous catalyst layer being formed on a surface of the anode catalyst layer and having a higher density of platinum-type catalyst than the anode catalyst layer and (2) an electrolyte polymer layer is formed at the interface between the anode catalyst layer and the polymer electrolyte membrane.

In the fuel cell of the present invention, the discontinuous catalyst layer described above can reduce the amount of the fuel passing through the polymer electrolyte membrane to the cathode (i.e. crossover) because even the fuel passing through the defects (i.e. micro cavities such as cracks and recesses where the catalyst does not exist) of the anode catalyst layer without reacting is involved in the anode reaction. Thereby, a decrease in voltage at the cathode can be prevented and the electricity generation characteristics can be improved.

Moreover, the electrolyte polymer layer described above covers the defects of the anode catalyst layer, and thus the thickness of electrolyte as a whole is increased locally at portions opposing (corresponding) to the defects. This can reduce the amount of crossover (i.e. the amount of the fuel passing through the defects of the anode catalyst layer and the polymer electrolyte membrane to the cathode without reacting), which prevents a decrease in voltage at the cathode, leading to the improvement of electricity generation characteristics.

Further, the electrolyte polymer layer as described above can reduce the physical resistance in the thickness direction at the interface because it improves the adhesion between the polymer electrolyte membrane and the anode catalyst layer at the interface. In other words, a decrease in proton conductivity can be prevented. This prevents local polarization from occurring between the polymer electrolyte membrane and the anode catalyst layer, leading to the improvement of electricity generation characteristics.

In addition to the above advantages, because the electrolyte polymer layer described above can be formed under relatively mild adhesion conditions, which will be described later, the polymer electrolyte membrane and the anode catalyst layer can be integrated (combined) into a single configuration while the porous structure of the anode catalyst layer is maintained. Accordingly, the diffusibility of fuel and the removability of carbon dioxide are not impaired. At the same time, the local polarization between the polymer electrolyte membrane and the anode catalyst layer can be prevented from occurring, and thus the electricity generation characteristics can be improved.

It is noted that the discontinuous catalyst layer of the fuel cell of the present invention preferably comprises a plurality of catalyst islands, i.e. island-like catalyst portions. In other words, the discontinuous catalyst layer may be in an island pattern.

As described above, in the fuel cell of the present invention, the discontinuous catalyst layer is formed on the surface of the anode catalyst layer. Accordingly, when the surface of the anode catalyst layer is observed from the above (the upper side along the direction vertical to the surface thereof), two kinds of parts can be observed on the surface of the anode catalyst layer: the parts where platinum type catalyst particles exist at a larger amount and the parts where platinum catalyst particles exist at a smaller amount. On the surface of the anode catalyst layer having the discontinuous catalyst layer, the ratio ($R_1$=Pt/C) of platinum atoms to carbon atoms is preferably 0.2 to 0.8 at the discontinuous catalyst layer side. Since the discontinuous catalyst layer has a higher density (existence probability) of platinum catalyst than the anode catalyst layer, the ratio ($R_2$=Pt/C) of platinum atoms to carbon atoms on the surface of the anode catalyst layer before the formation of the discontinuous catalyst layer should be smaller than $R_1$.

By setting the ratio $R_1$ to 0.2 to 0.8, the conduction of protons is not inhibited by the discontinuous catalyst layer, and therefore it is possible to obtain the effect of reducing the amount of the fuel passing through the micro_defects of the anode catalyst layer and the polymer electrolyte membrane to the cathode without reacting. When the ratio $R_1$ is less than 0.2, the above effect is unlikely to be obtained. The ratio exceeding 0.8, on the other hand, is not preferable because the discontinuous catalyst layer will nearly be a continuous layer and the conduction of protons tends to be inhibited.

The platinum type catalyst may be a platinum metal (simple substance or element), and the preferred platinum type catalyst is an alloy or mixture containing platinum and at least one selected from the group consisting of ruthenium, iron, cobalt, nickel, chromium, molybdenum, rhodium, palladium, osmium and iridium.

With the use of the platinum type catalysts listed above, it is possible to prevent the platinum type catalysts from being poisoned by CO which is a reaction intermediate, and the complete oxidation of fuel can be facilitated.

The electrolyte polymer layer is preferably made of a polymer electrolyte (a polymer compound) having at least one ion conductive functional group selected from the group consisting of a phosphonyl group, a phosphinyl group, a sulfonyl group, a sulfinyl group, a carboxyl group, a sulfone group, a mercapto group, an ether bond group, a hydroxyl group, a quaternary ammonium group, an amino group and a phosphate group.

The polymer electrolytes listed above have a functional group capable of retaining and easily separating protons. If an electrolyte polymer layer is formed using such a polymer electrolyte having the functional group, therefore, the resistance polarization in the thickness direction of the electrolyte polymer layer can be reduced, leading to the improvement of electricity generation characteristics of the fuel cell to be obtained.

Further, the electrolyte polymer layer is preferably formed by a wet application process in which a solution containing the polymer electrolyte is applied onto the anode catalyst layer.

This ensures the covering of the defects in the anode catalyst layer with the electrolyte polymer layer, which allows the thickness of electrolyte as a whole to be increased locally at portions opposing to the defects. As a result, it is possible to further suppress the crossover of fuel.

As for the fuel, it is effective to use an organic fuel containing at least one organic compound selected from the group consisting of methanol, dimethyl ether and ethylene glycol as the fuel. It is also effective to utilize the fuel cell of the present invention as a direct type fuel cell.

With the use of methanol or dimethyl ether having no C—C bond as the fuel, anode reaction polarization can be reduced. In the case of using ethylene glycol, it is effective that it is used as an aqueous alkaline solution containing ethylene glycol and KOH or the like because the oxidation reactivity of ethylene glycol is enhanced.

The present invention also provides a method for producing the above-described fuel cell of the present invention. The method can be mainly classified into two types.

The first method for producing a fuel cell includes:

a first step of forming a catalyst layer containing at least conductive carbon particles supporting a platinum type catalyst thereon and a hydrogen ion conductive polymer electrolyte;

a second step of forming a discontinuous catalyst layer or an electrolyte polymer layer on the surface of the catalyst layer; and a third step of placing a hydrogen ion conductive polymer electrolyte membrane on the surface of the catalyst layer at the discontinuous catalyst layer side or the electrolyte polymer layer side and hot pressing the catalyst layer and the polymer electrolyte membrane to be integrated into a single configuration.

The second method for producing a fuel cell includes:

a first step of forming a catalyst layer containing at least conductive carbon particles supporting a platinum catalyst thereon and a hydrogen ion conductive polymer electrolyte;

a second step of forming a discontinuous catalyst layer on the surface of the catalyst layer;

a third step of forming an electrolyte polymer layer on the surface of the catalyst layer at the discontinuous catalyst layer side by a wet application process; and a fourth step of placing a hydrogen ion conductive polymer electrolyte membrane on the surface of the electrolyte polymer layer and hot pressing the catalyst layer and the polymer electrolyte membrane to be integrated into a single configuration.

According to the above-described method for producing a fuel cell, unlike the case where the discontinuous catalyst layer is directly formed on the surface of the polymer electrolyte membrane, the discontinuous catalyst layer can be formed at the interface between the polymer electrolyte membrane and the anode catalyst layer without clogging water clusters (apertures) serving as the proton conducting pathway in the near surface of the polymer electrolyte membrane. Further, unlike the case where the electrolyte polymer layer is directly formed on the surface of the polymer electrolyte membrane, the electrolyte polymer layer covers the defects of the anode catalyst layer without failure.

When the discontinuous catalyst layer is formed on the anode catalyst layer and the electrolyte polymer layer is formed on the discontinuous catalyst layer, in addition to the above advantages, the proton conductivity can be improved while the electron conducting pathway is maintained. Therefore, a fuel cell having an improved reaction contribution rate (utilization rate) of the discontinuous catalyst layer can be obtained.

In the aforesaid method for producing a fuel cell, the discontinuous catalyst layer is preferably formed by plasma chemical-vapor deposition (plasma CVD) using an organic metal complex containing a platinum-based metal. In the present invention, the platinum-based metal includes platinum, alloy and mixture, the same as those which have been described above for the platinum type catalyst.

In the plasma chemical-vapor deposition, more than two reactive species containing a platinum-based metal such as ions and radicals are allowed to exist in plasma. These reactive species are then migrated to the surface of the anode catalyst layer, during which the particles of the reactive species are collided with each other to form a discontinuous catalyst layer composed of three-dimensional catalyst islands, i.e. island-like catalyst portions. This discontinuous catalyst layer is made of a catalyst composed mainly of platinum, and therefore the complete oxidation of the fuel can be facilitated.

When generating glow discharge plasma by applying a voltage in the plasma chemical-vapor deposition, it is preferred that only an alternating voltage be applied, or a direct voltage with a superimposed alternating voltage be applied. This can prevent thermal damage to the surface of the anode catalyst layer due to an accidental abnormal discharge.

The discontinuous catalyst layer may also preferably be formed by spraying an ink containing at least a platinum type catalyst and an organic dispersion medium by means of an ink jet method or spraying method, followed by drying. This allows solution droplets containing a platinum type catalyst to be regularly and finely arranged on the surface of the anode catalyst layer. Thereby, a discontinuous catalyst layer composed of a plurality of catalyst islands arranged regularly and finely thereon is formed. With the use of this discontinuous catalyst layer, the unreacted fuel passing through the anode catalyst layer can be effectively involved in the reaction, thus reducing the amount of crossover.

The embodiments of the present invention are specifically described below with reference to the accompanying drawings. It is to be understood that the same reference numerals are given to the same or corresponding parts, and some redundant descriptions are omitted.

EMBODIMENT 1

Figure 1:
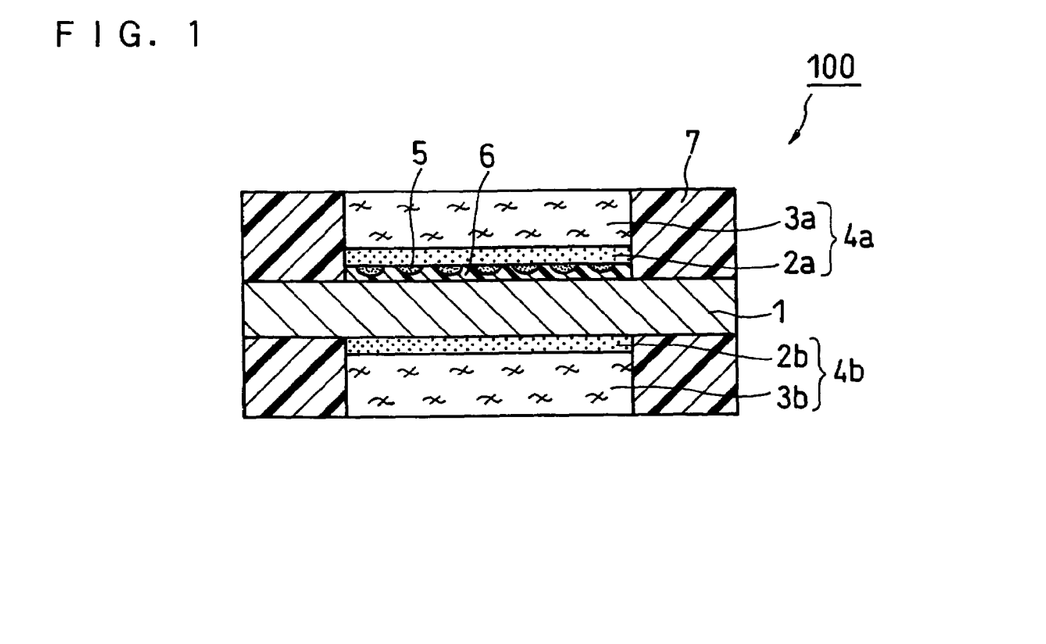
FIG. 1 is an enlarged schematic cross sectional view of an MEA of a fuel cell according to Embodiment 1 of the present invention.

FIG. 1 is a schematic cross sectional view illustrating the structure of a membrane electrode assembly (MEA) of a fuel cell according to Embodiment 1 of the present invention. As shown in FIG. 1, a membrane electrode assembly 100 of a fuel cell of the present invention is composed of a hydrogen ion conductive polymer electrolyte membrane 1, an anode 4a and a cathode 4b positioned on each side of the polymer electrolyte membrane 1. The anode 4a is composed of an anode catalyst layer 2a and an anode diffusion layer 3a. The cathode 4b is composed of a cathode catalyst layer 2b and a cathode diffusion layer 3b.

On both sides of the polymer electrolyte membrane 1 are placed the anode catalyst layer 2a and the cathode catalyst layer 2b. On the outer side of the anode catalyst layer 2a is placed the anode diffusion layer 3a, and on the outer side of the cathode catalyst layer 2b is placed the cathode diffusion layer 3b.

Gas sealants 7 are placed on the outer periphery of the anode 4a and the cathode 4b with the polymer electrolyte membrane 1 sandwiched therebetween so as to prevent a fuel or an oxidant from leaking out. The gas sealants 7 are, for example, in the continuous ring form.

The anode catalyst layer 2a and the cathode catalyst layer 2b are made of a thin film having a thickness of about 10 to 50 mm and composed mainly of a polymer electrolyte and conductive carbon particles supporting a platinum type catalyst containing a platinum-based metal.

The anode diffusion layer 3a and the cathode diffusion layer 3b are required to have fuel or oxidant diffusibility, carbon dioxide removability for removing carbon dioxide generated by electricity generation, and electron conductivity. For this reason, a conductive porous substrate such as carbon paper or carbon cloth may be used for them.

The conductive porous substrate may be treated for water repellency based on a conventional technique. Further, a water repellent carbon layer (so-called "C layer") may be formed on the surface of the conductive porous substrate to be in contact with the catalyst layer.

A shown in FIG. 1, a discontinuous catalyst layer 5 composed of a plurality of catalyst islands that contain more platinum type catalyst than the rest portions and an electrolyte polymer layer 6 are formed at the interface between the polymer electrolyte membrane 1 and the anode catalyst layer 2a in the fuel cell of the present invention.

As the polymer electrolyte for forming the polymer electrolyte membrane 1, the anode catalyst layer 2a and the cathode catalyst layer 2b, and the electrolyte polymer layer 6, there can be used polymer electrolytes having a fluorocarbon as a main chain and at least one ion conductive functional group selected from the group consisting of a phosphonyl group, a phosphinyl group, a sulfonyl group, a sulfinyl group, a carboxyl group, a sulfone group, a mercapto group, an ether bond group, a hydroxyl group, a quaternary ammonium group, an amino group and a phosphate group.

As the polymer electrolyte membrane 1, a polymer electrolyte membrane made of perfluorocarbonsulfonic acid and having excellent proton conductivity, excellent heat resistance and excellent oxidation resistance is preferred. For example, Nafion (trade name) manufactured by E.I. Du Pont de Nemours & Co. Inc., USA is preferred for use.

The platinum type catalyst used for the anode catalyst layer 2a and the discontinuous catalyst layer 5 can be a platinum metal (simple substance or element), an alloy or mixture containing platinum and at least one selected from the group consisting of ruthenium, iron, cobalt, nickel, chromium, molybdenum, rhodium, palladium, osmium and iridium. Particularly, from the viewpoint of preventing the catalyst poisoning due to carbon monoxide, an alloy or mixture containing platinum and ruthenium is preferred for use.

As the catalyst for the cathode catalyst layer 2b, the above platinum type catalysts can be used, but from the viewpoint of improving the (four electron) reduction rate of oxygen, a platinum metal (simple substance or element) is preferred for use.

A description is now given of a method for producing a membrane electrode assembly (MEA) for constituting the fuel cell according to Embodiment 1 of the present invention.

The anode catalyst layer 2a is formed by applying, onto a conductive porous substrate, a paste ink for forming a catalyst layer. The ink for forming a catalyst layer can be prepared by mixing conductive carbon particles supporting a platinum type catalyst metal, a polymer electrolyte and a dispersion medium using a disperser such as a bead mill, followed by drying.

As the dispersion medium used for preparing the ink for forming a catalyst layer, a liquid containing an alcohol capable of dissolving or dispersing the polymer electrolyte (only a part of the polymer electrolyte may be dissolved or dispersed). The dispersion medium preferably contains at least one selected from the group consisting of water, methanol, propanol, n-butylalcohol, isobutyl alcohol, sec-butylalcohol and tert-butylalcohol. The above listed water and alcohols may be used singly or in any combination of two or more. Particularly preferred is a linear alcohol having one OH group in the molecule, namely ethanol. An alcohol having an ether bond such as ethylene glycol monomethyl ether is also preferred.

The discontinuous catalyst layer 5 is then formed on the anode catalyst layer 2a either by a dry process or a wet process. The dry process includes, for example, plasma CVD method using an organic metal complex containing atoms constituting a platinum type catalyst, which is to be contained in the discontinuous catalyst layer 5. The wet process includes, for example, an inkjet method or spraying method using the same ink as the one used for forming the catalyst layer described above.

When the discontinuous catalyst layer 5 is formed, the conditions for the dry process or wet process, such as the deposited amount or the composition of the ink, should be adjusted such that the surface of the anode catalyst layer 2a having the discontinuous catalyst layer 5 formed thereon has a ratio of platinum atoms to carbon atoms (Pt/C) of 0.2 to 0.8 at the discontinuous catalyst layer side.

After the discontinuous catalyst layer 5 is formed, the electrolyte polymer layer 6 is formed. The electrolyte polymer layer 6 can be formed by spraying, onto the surface of the anode catalyst layer 2a having the discontinuous catalyst layer 5 formed thereon, a low-viscosity polymer solution prepared by dissolving or uniformly dispersing a polymer electrolyte in a solvent, followed by drying, the details of which will be described later in this specification. The electrolyte polymer layer 6 is preferably formed such that the electrolyte polymer layer 6 covers the defects of the anode catalyst layer 2a. The thickness of the electrolyte polymer layer 6 is preferably not greater than 30 μm.

The "low-viscosity polymer solution" has a viscosity of 10 to 100 cp, which can be measured by B-type viscometer.

Thereby, the anode 4a is obtained. The cathode 4b is produced in the same manner as described above except that the discontinuous catalyst layer and the electrolyte polymer layer are not formed. However, the cathode 4b may have the discontinuous catalyst layer and the electrolyte polymer layer as long as the effect of the present invention is not impaired.

Subsequently, the anode 4a having the discontinuous catalyst layer 5 and the electrolyte polymer layer 6, the polymer electrolyte membrane 1 and the cathode 4b are stacked such that the anode catalyst layer 2a and the cathode catalyst layer 2b respectively face the polymer electrolyte membrane 1. The whole is then bonded by a hot press method such as heating or applying a pressure. Then, gas sealants 7 are arranged on the outer periphery of the anode 4a and the cathode 4b with the polymer electrolyte membrane 1 sandwiched therebetween, followed by heat-welding. Thereby, the MEA of the present invention is obtained.

Figure 2:
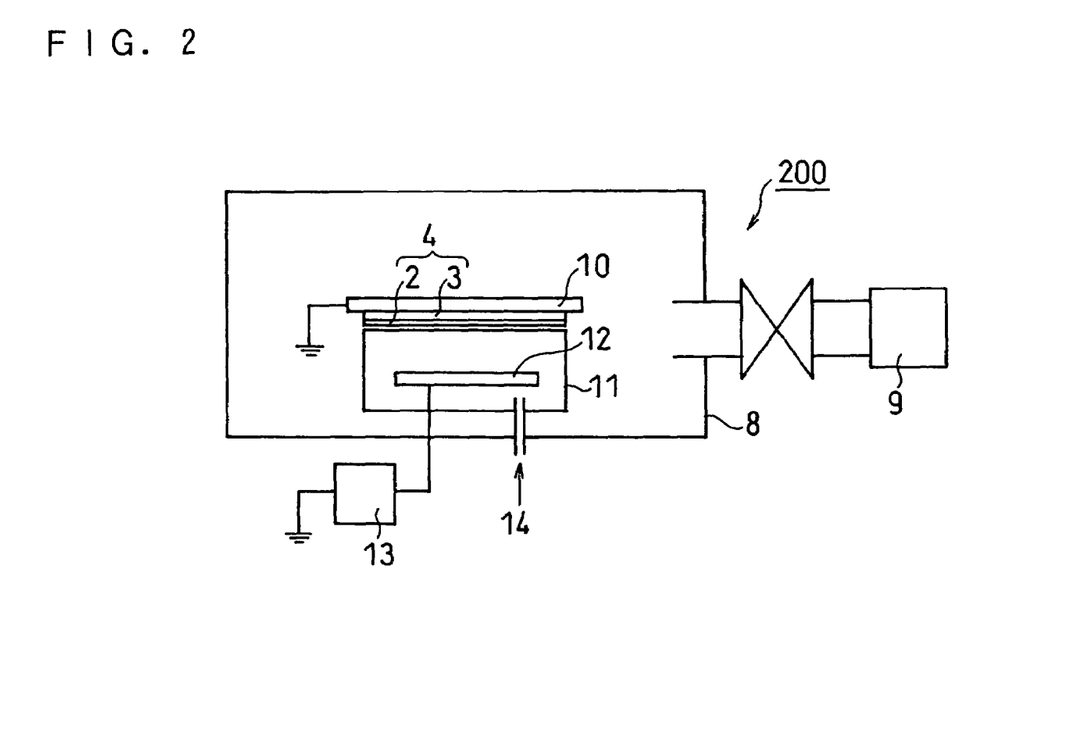
FIG. 2 is a schematic diagram illustrating the structure of a surface treatment apparatus used in a method for producing a fuel cell according to Embodiment 1 of the present invention.

FIG. 2 is a schematic diagram illustrating the structure of a surface treatment apparatus for forming the discontinuous catalyst layer 5 by plasma CVD in Embodiment 1 of the present invention. In this surface treatment apparatus 200, a vacuum pump 9 produces a high vacuum, for example, of $10^{-2}$ to $10^{-3}$ Pa in a vacuum chamber 8. When the discontinuous catalyst layer 5 is formed on the anode catalyst layer 2a, the anode catalyst layer 2a is held with an electrode holder 10 having cooling function so as to prevent the thermal damage to the anode catalyst layer 2a during the formation of the discontinuous catalyst layer 5.

Inside a discharge tube (filled with nonequilibrium plasma) 11 is placed a pipe-like discharge electrode 12, which is connected to a generator 13 for generating plasma. The generator 13 for generating plasma may be either AC discharge type in which only an alternating voltage is applied or AC/DC discharge type in which a direct voltage with a superimposed alternating voltage is applied.

A raw material gas containing an organic metal complex, i.e. the material for forming the discontinuous catalyst layer 5, is introduced from a raw material gas inlet 14 into the discharge tube 11.

Figure 3:
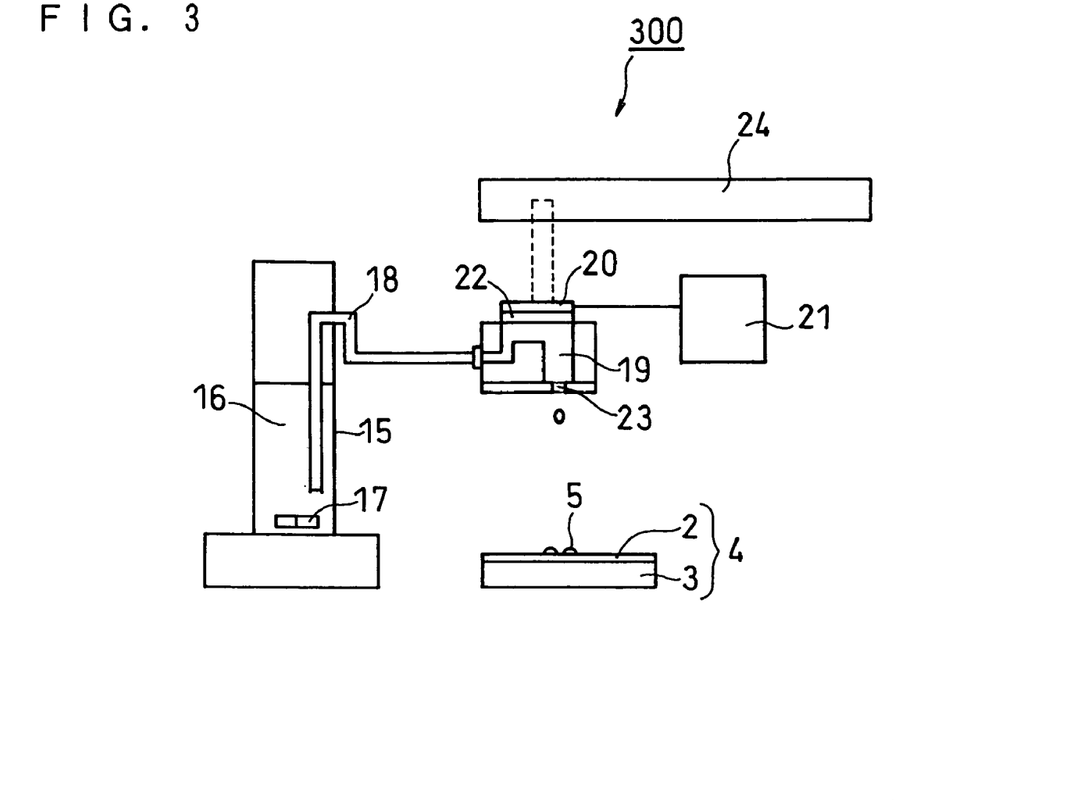
FIG. 3 is a schematic diagram illustrating the structure of an inkjet type application apparatus used in a method for producing a fuel cell according to Embodiment 1 of the present invention.

The discontinuous catalyst layer 5 in the present invention can be formed also by an inkjet type application apparatus as shown in FIG. 3. FIG. 3 is a schematic diagram illustrating the structure of an inkjet type application apparatus 300 for forming the discontinuous catalyst layer 5 in a fuel cell according to Embodiment 1 of the present invention.

In the inkjet type application apparatus 300, a tank 15 is filled with an ink 16 for forming the discharge catalyst layer 5 containing at least a platinum type catalyst and an organic dispersion medium. The ink 16 is stirred by a stirrer 17 in the tank 15, and therefore the ink 16 is always in the flowing state in the tank 15.

The ink 16 is supplied to an ink chamber 19 through an ink supplying path 18. Outside the ink chamber 19 is provided a piezoelectric device 20. A pulse generator 21 sends an electric signal to the piezoelectric device 20 and the piezoelectric device 20 deforms by the electric signal. The deformed piezoelectric device 20 sends pressure through a flexible plate 22 to the ink chamber 19 so as to spray the ink 16 from an inkjet nozzle 23. The inkjet nozzle 23 can be moved in two horizontal directions (i.e. X axis and Y axis) at an arbitrary speed by an actuator 24. The inkjet nozzle 23 is placed above the anode catalyst layer 2a of the anode 4a. The inkjet nozzle 23 sprays the ink 16 while moving to form the discontinuous catalyst layer 5 on the anode catalyst layer 2a.

Figure 4:
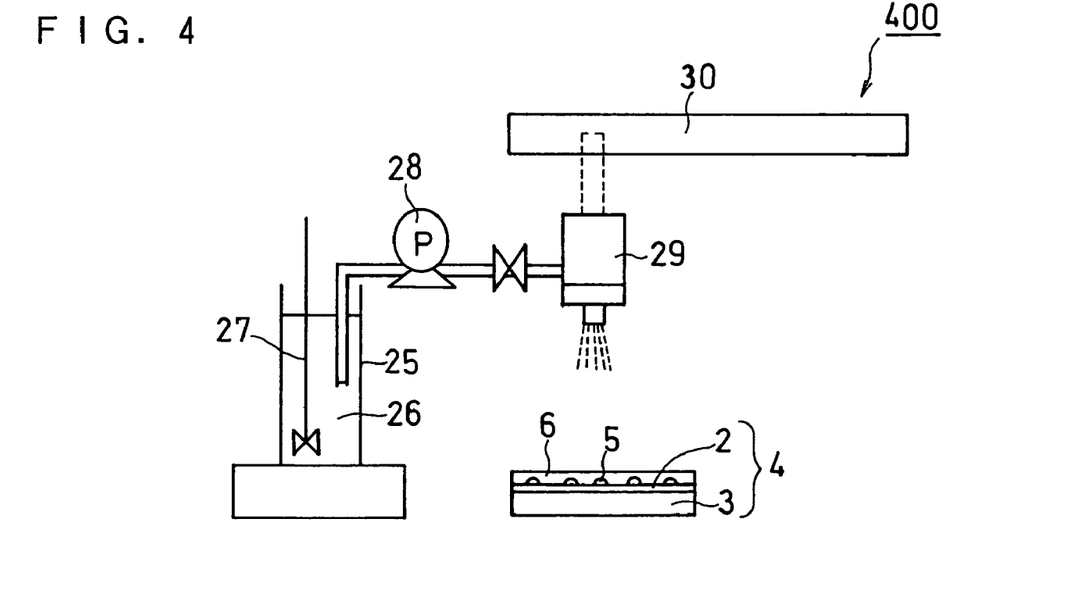
FIG. 4 is a schematic diagram illustrating the structure of a spray type application apparatus used in a method for producing a fuel cell according to Embodiment 1 of the present invention.

FIG. 4 is a schematic diagram illustrating the structure of a spray type application apparatus 400 for forming the electrolyte polymer layer 6 in a fuel cell according to Embodiment 1 of the present invention. In the spray type application apparatus 400, a tank 25 is filled with a solution 26 for forming the electrolyte polymer layer. The solution 26 is a low-viscosity polymer solution prepared by dissolving or uniformly dispersing a polymer electrolyte in a solvent as previously mentioned.

The solution 26 for forming the electrolyte polymer layer is stirred by a stirrer 27 in the tank 25, and therefore the solution 26 is always in the flowing state in the tank 25. The solution 26 is supplied to a spray nozzle 29 with pressure by a pump 28. The spray nozzle 29 can be moved in two horizontal directions (i.e. X axis and Y axis) at an arbitrary speed by an actuator 30. The spray nozzle 29 is placed above the anode catalyst layer 2a having the discontinuous catalyst layer 5 formed thereon. The spray nozzle 29 sprays the solution 26 for forming the electrolyte polymer layer while moving to form the electrolyte polymer layer 6 on the discontinuous catalyst layer 5.

When the MEA 100 produced in the manner as described above is used in a fuel cell, a pair of plate-like separators for mechanically fixing the MEA 100 are placed on the outer surfaces of the MEA 100. The separators have, on the surface thereof to be in contact with the MEA 100, a channel for directly supplying an organic fuel and water to the anode, one for supplying an oxidant such as oxygen and air or one for removing an electrode reaction product and unreacted reactant gas. The MEA 100 is fixed by a pair of separators as just described. Electricity is generated by supplying a fuel to the channel of one of the separators 100 and an oxidant to the channel of the other of the separators 100.

In order to supply a fuel and an oxidant to the channels, there is required a manifold in which pipes for supplying a fuel and an oxidant are branched to the corresponding separators and the branched pipes are directly connected to the channels on the separators. Particularly, a manifold in which external pipes for supplying a fuel or oxidant are directly connected to the separators is called "external manifold". There is another type of manifold called "internal manifold", which has a simpler structure. An internal manifold is composed of apertures formed in the separators having channels thereon. The inlet and outlet apertures are connected with a channel. A fuel or oxidant is supplied to the channel directly from the aperture. Either type of manifold can be used in the present invention. The separator may be made of any material such as a metal material, a carbon material or a material prepared by mixing graphite and resin.

EMBODIMENT 2

Figure 5:
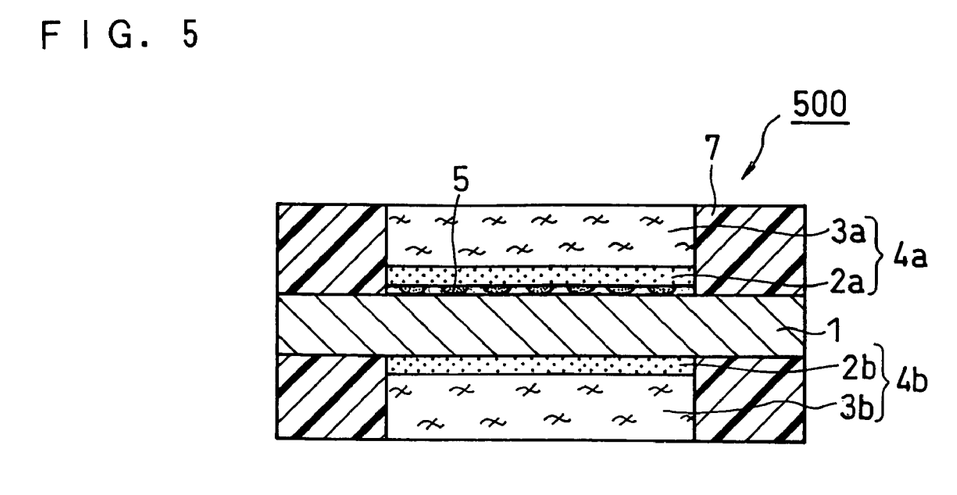
FIG. 5 is an enlarged schematic cross sectional view of an MEA of a fuel cell according to Embodiment 2 of the present invention.

FIG. 5 is a schematic cross sectional view of a membrane electrode assembly (MEA) 500 of a fuel cell according to Embodiment 2 of the present invention.

The MEA of Embodiment 2 of the present invention has the same structure as the MEA of Embodiment 1 of the present invention except that the electrolyte polymer layer 6 is not formed. Accordingly, the MEA of Embodiment 2 can be produced in the same manner as the MEA of Embodiment 1.

EMBODIMENT 3

Figure 6:
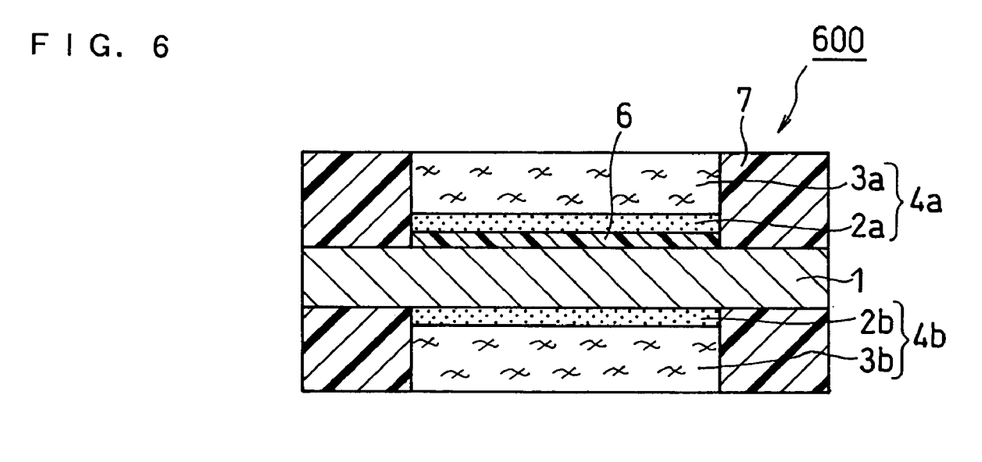
FIG. 6 is an enlarged schematic cross sectional view of an MEA of a fuel cell according to Embodiment 3 of the present invention.

FIG. 6 is a schematic cross sectional view illustrating the structure of a membrane electrode assembly (MEA) 600 of a fuel cell according to Embodiment 3 of the present invention.

The MEA of Embodiment 3 of the present invention has the same structure as the MEA of Embodiment 1 of the present invention except that the discontinuous catalyst layer 5 is not formed. Accordingly, the MEA of Embodiment 3 can be produced in the same manner as the MEA of Embodiment 1.

The embodiments of the present invention have been described in detail above, but it should be understood that the present invention is not limited thereto.

The present invention is more specifically described below in the following examples, but it is to be understood that the present invention is not limited to the examples below.

EXAMPLE 1

In this example, an MEA having the structure shown in FIG. 1 was first produced.

Ketjen Black EC (manufactured by AKZO Chemie Company of the Netherlands) having an average primary particle size of 30 nm serving as the conductive carbon powers was allowed to support 25 wt % of platinum particles and 25 wt % ruthenium particles, each having an average particle size of 30 Å to give an anode catalyst (catalyst supporting particles). Likewise, Ketjen Black EC was allowed to support 50 wt % of platinum particles having an average particle size of 30 Å to give a cathode catalyst (catalyst supporting particles).

Subsequently, a dispersion prepared by dispersing the anode catalyst in an aqueous solution of isopropanol was mixed with a solution prepared by dispersing a polymer electrolyte in ethanol, which was then highly dispersed by a bead mill to give a paste ink for forming an anode catalyst layer. The ink for forming an anode catalyst layer contained the conductive carbon particles and the polymer electrolyte in a weight ratio of 1:1. The polymer electrolyte used here was perfluorocarbon sulphonic acid ionomer (Flemion (trade name), manufactured by Asahi Glass Co., Ltd.).

The ink for forming an anode catalyst layer thus prepared was applied onto carbon paper (TGP-H060, manufactured by Toray Co., Ltd.) constituting a diffusion layer 3a using a bar coater, which was then dried at room temperature in air for 6 hours to form an anode catalyst layer 2a having a thickness of 20 μm. Thereby, an anode 4a was produced. The amount of platinum catalyst contained in the anode 4a was 1.8 mg/cm².

In the same manner as the anode catalyst layer 2a was produced except that the cathode catalyst was used instead of the anode catalyst, a cathode catalyst layer 2b was formed on carbon paper (TGP-H060, manufactured by Toray Co., Ltd.) constituting a diffusion layer 3b, and thus a cathode 4b was produced. The amount of platinum catalyst contained in the cathode 4b was 1.8 mg/cm².

The anode 4a was placed on an electrode holder 10 in a vaccum chamber 8 of a surface treatment apparatus 200 having the structure shown in FIG. 2. The vacuum chamber 8 was then evacuated, after which organic metal complexes ($C_9H_{16}Pt$ and $C_{14}H_{18}Ru$) and hydrogen gas were introduced into a discharge tube 11. The flow rates of the gases were adjusted such that the pressure ratio of the organic metal compound gases (i.e. $C_9H_{16}Pt$ and $C_{14}H_{18}Ru$) and hydrogen gas was 1:1:8 and that the total gas pressure was 20 Pa. Subsequently, a direct voltage of 800 V and an alternating voltage of 700 V (20 kHz) were superimposed and applied to a discharge electrode 12 to generate nonequilibrium plasma for 20 seconds. Thereby, a discontinuous catalyst layer 5 was formed on the anode catalyst layer 2a.

A polymer electrolyte (perfluorocarbon sulphonic acid ionomer (Flemion (trade name), manufactured by Asahi Glass Co., Ltd.)) was dissolved in ethanol to prepare a low-viscosity polymer solution 23 having a solid content of 8 wt %. With the use of a spray type application apparatus having the structure shown in FIG. 4, the low-viscosity polymer solution 23 was uniformly sprayed and applied onto the surface of the anode catalyst layer 2a having the discontinuous catalyst layer 5 formed thereon, which was then dried at room temperature in air for 6 hours to form an electrolyte polymer layer 6 having a thickness of 10 μm. Thereby, the anode 4a of the present invention was produced.

The anode 4a and the cathode 4b produced in the manner described above were cut into a size of 6 cm×6 cm. The anode 4a, a polymer electrolyte membrane 1 (perfluorocarbon sulphonic acid ion exchange membrane (Nafion 117(trade name), manufactured by E.I. Du Pont de Nemours & Co. Inc., USA)), and the cathode 4b were stacked such that the discontinuous catalyst layer 5 and the cathode catalyst layer 2 respectively face the polymer electrolyte membrane 1. The whole was bonded by hot pressing under 3 MPa at 135° C. for 15 minutes.

The gas sealants 7 were placed on the outer periphery of the anode 4a and the cathode 4b with the polymer electrolyte membrane 1 sandwiched therebetween and hot pressing was performed under 3 MPa at 135° C. for 30 minutes to give a membrane electrode assembly (MEA) of the present invention.

The obtained MEA was then sandwiched between separators (resin-impregnated graphite plates) with an outer size of 10 cm×10 cm and a thickness of 4 mm, current collector plates, heaters, insulating plates and end plates. The whole was then fixed with clamping rods. Thereby, a fuel cell of the present invention was produced. The clamping pressure used here was 20 kgf/cm² per area of the separator. The separators had a serpentine channel with a width of 1.5 mm and a depth of 1 mm formed on the surface thereof. The current collector plates and the end plates used here were made of a stainless steel plate plated with gold.

In the manner as described above, a fuel cell A of the present invention was produced.

EXAMPLE 2

A fuel cell B of the present invention was produced in the same manner as in Example 1 except that the discontinuous catalyst layer 5 was formed under the conditions: the pressure ratio of the organic metal compound gases ($C_9H_{16}Pt$ and $C_{14}H_{18}Ru$) and hydrogen gas of 1:1:8, the total gas pressure of 15 Pa and the time for generating nonequilibrium plasma of 15 seconds.

EXAMPLE 3

A fuel cell C of the present invention was produced in the same manner as in Example 1 except that the discontinuous catalyst layer 5 composed of catalyst islands with a dot size of 25 μm was formed on the anode catalyst layer 2a by spraying 1.5 pl of an ink for forming a discontinuous catalyst layer with the application of a voltage of 60 V (200 Hz) to a piezoelectric device 20 in an inkjet type application apparatus having the structure shown in FIG. 3. The ink for forming a discontinuous catalyst layer was prepared by dispersing a platinum-based metal particles having an average particle size of 30 nm in an aqueous solution of isopropanol

EXAMPLE 4

A fuel cell D of the present invention was produced in the same manner as in Example 1 except that the electrolyte polymer layer 6 was not formed.

EXAMPLE 5

A fuel cell E of the present invention was produced in the same manner as in Example 2 except that the electrolyte polymer layer 6 was not formed.

EXAMPLE 6

A fuel cell F of the present invention was produced in the same manner as in Example 1 except that the discontinuous catalyst layer 5 was formed under the conditions: the pressure ratio of the organic metal compound gases ($C_9H_{16}Pt$ and $C_{14}H_{18}Ru$) and hydrogen gas of 1:1:8, the total gas pressure of 15 Pa and the time for generating nonequilibrium plasma of 10 seconds, and that the electrolyte polymer layer 6 was not formed.

EXAMPLE 7

A fuel cell G of the present invention was produced in the same manner as in Example 1 except that the discontinuous catalyst layer 5 was not formed.

EXAMPLE 8

A fuel cell H of the present invention was produced in the same manner as in Example 1 except that the discontinuous catalyst layer 5 was not formed and that the electrolyte polymer layer 6 was formed to have a thickness of 30 μm.

EXAMPLE 9

A fuel cell I of the present invention was produced in the same manner as in Example 1 except that the discontinuous catalyst layer 5 was not formed and that the electrolyte polymer layer 6 was formed to have a thickness of 50 μm.

COMPARATIVE EXAMPLE 1

A fuel cell for comparison 1 was produced in the same manner as in Example 1 except that the discontinuous catalyst layer 5 and the electrolyte polymer layer 6 were not formed.

COMPARATIVE EXAMPLE 2

A fuel cell for comparison 2 was produced in the same manner as in Example 1 except that, instead of the discontinuous catalyst layer 5, a continuous catalyst layer with a thickness of 50 nm was formed on the surface of the anode catalyst layer 2a by chemical vapor-deposition method in which a platinum metal was heated and vaporized with an electron beam.

[Evaluation Test]

The fuel cells of the present invention A to I and the fuel cells for comparison 1 and 2 produced in the above examples and comparative examples were analyzed, by X-ray photoelectron spectroscopy (XPS), for the ratio of platinum atoms to carbon atoms (Pt/C) on the outermost surface of the anode catalyst layer 2a at the discontinuous catalyst layer 5 side. More specifically, the ratio was determined from the peak intensity ratio of $Pt_{4f7/2}$ and $C_{1s}$ ($Pt_{4f7/2}/C_{1s}$) taking the difference in X-ray photoionization cross section between carbon atoms and platinum atoms into account. The results are shown in Table 1.

The presence of the discontinuous catalyst layer 5 was confirmed by two-dimensional analysis (surface analysis) using a scanning Auger microprobe (SAM).

The fuel cells A to I and the fuel cells for comparison 1 and 2 were tested for the following characteristics. The results are shown in Table 1.

(1) Amount of Methanol Crossover

Each of the above-obtained fuel cells was operated at a current density of 100 mA/cm² at a cell temperature of 60° C. by supplying 2 mol/l of an aqueous solution of methanol to the anode at a flow rate of 2 ml/min and air to the cathode at a flow rate of 1 L/min., during which the amount of methanol (mol/min) discharged from the anode was measured.

The difference was calculated by subtracting the amount of methanol consumed by the generation of electricity ($3.731 \times 10^{-4}$ mol/min) and the amount of methanol discharged from the anode from the amount of methanol supplied ($4 \times 10^{-3}$ mol/min), which was defined as "amount of methanol crossover". The obtained value was converted into a unit of current density (i.e. mA/cm²).

(2) Current-Voltage Characteristics

Each of the above-obtained fuel cells was operated at a current density of 100 mA/cm² or 300 mA/cm² at a cell temperature of 60° C. by supplying 2 mol/l of an aqueous solution of methanol to the anode at a flow rate of 2 ml/min and air to the cathode at a flow rate of 1 L/min, during which the effective voltage was measured.

(3) Continuous Electricity Generation Characteristics

Each of the above-obtained fuel cells was operated at a current density of 100 mA/cm² at a cell temperature of 60° C. for 12 hours by supplying 2 mol/l of an aqueous solution of methanol to the anode at a flow rate of 2 ml/min and air to the cathode at a flow rate of 1 L/min, during which the effective voltage was measured. The average of the obtained effective voltage was calculated as "initial voltage". The fuel cell in test was then stopped and allowed to stand for 12 hours, after which the fuel cell was again continuously operated for 12 hours. This cycle (i.e. standing for 12 hours and continuous operation for 12 hours) was repeated 50 times. The average of the effective voltage during the repetition of the above cycle was determined. The ratio of this effective voltage to the initial voltage was then calculated.

TABLE 1

| Battery Number | Presence of Catalyst Islands | Presence of Electrolyte polymer layer | XPS Peak Intensity Ratio [$Pt_{4f7/2}/C_{1s}$] | Thickness of Electrolyte Polymer Layer [μm] | Amount of Methanol Crossover [mA/cm²] | Current-Voltage Characteristics [mV] | | Continuous Electricity Generation Characteristics [%] |
|---|---|---|---|---|---|---|---|---|
| | | | | | | 100 mA/cm² | 300 mA/cm² | |
| A | Yes (Plasma CVD) | Yes (Spray method) | 0.38 | 10 | 25 | 511 | 324 | 96 |

TABLE 1-continued

| Battery Number | Presence of Catalyst Islands | Presence of Electrolyte polymer layer | XPS Peak Intensity Ratio [Pt$_{4f7/2}$/C$_{1s}$] | Thickness of Electrolyte Polymer Layer [μm] | Amount of Methanol Crossover [mA/cm$^2$] | Current-Voltage Characteristics [mV] 100 mA/cm$^2$ | Current-Voltage Characteristics [mV] 300 mA/cm$^2$ | Continuous Electricity Generation Characteristics [%] |
|---|---|---|---|---|---|---|---|---|
| B | Yes (Plasma CVD) | Yes (Spray method) | 0.22 | 10 | 42 | 489 | 295 | 93 |
| C | Yes (Inkjet) | Yes (Spray method) | 0.30 | 10 | 34 | 502 | 312 | 95 |
| D | Yes (Plasma CVD) | None | 0.38 | — | 67 | 467 | 266 | 90 |
| E | Yes (Plasma CVD) | None | 0.22 | — | 75 | 452 | 245 | 88 |
| F | Yes (Plasma CVD) | None | 0.16 | — | 106 | 437 | 220 | 82 |
| G | None | Yes (Spray method) | 0.08 | 10 | 93 | 443 | 240 | 87 |
| H | None | Yes (Spray method) | 0.08 | 30 | 84 | 448 | 243 | 87 |
| I | None | Yes (Spray method) | 0.08 | 50 | 79 | 432 | 213 | 84 |
| 1 | None | None | 0.08 | — | 160 | 408 | 165 | 65 |
| 2 | Continuous catalyst layer | Yes (Spray method) | >1.00 | 10 | 10 | 288 | Unable to perform | Unable to perform |

As evident from Table 1, in the fuel cells A to I, the amount of methanol crossover was successfully reduced because they had the discontinuous catalyst layer and/or the electrolyte polymer layer formed between the anode catalyst layer and the polymer electrolyte membrane. As a result, excellent electricity generation characteristics were obtained without impairing the utilization efficiency of fuel. Particularly, the comparison between the fuel cells A, D and G, or the comparison between the fuel cells B and E indicates that it is extremely effective to form both the discontinuous catalyst layer and the electrolyte polymer layer so as to reduce the amount of methanol crossover and to remarkably improve the electricity generation characteristics.

The fuel cell for comparison 1, on the other hand, had neither the discontinuous catalyst layer nor the electrolyte polymer layer between the polymer electrolyte membrane and the anode catalyst layer. Thus, the amount of methanol that directly reached the polymer electrolyte membrane through micro defects of the anode catalyst layer without reacting was not reduced, and therefore the electricity generation characteristics were significantly impaired. In the fuel cell for comparison 2, because the continuous vapor-deposited film made of platinum inhibited the proton conductivity, the film resistance increased, which significantly reduced the electricity generation characteristics.

The fuel cell of the present invention can utilize methanol, dimethyl ether or the like without reforming as the fuel, and it is useful as a power source for portable compact electronic devices such as cell phones, personal digital assistants (PDAs), notebook computers and camcorders. The present invention can also be used as a power source for electric scooters.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A fuel cell for generating electricity using a fuel and an oxidant comprising:
    a hydrogen ion conductive polymer electrolyte membrane;
    an anode including an anode catalyst layer on one surface of said polymer electrolyte membrane, and an anode diffusion layer on the outer surface of said anode catalyst layer; and
    a cathode including a cathode catalyst layer on the other surface of said polymer electrolyte membrane, and a cathode diffusion layer on the outer surface of said cathode catalyst layer,
    wherein said anode catalyst layer includes conductive carbon particles supporting a platinum catalyst thereon and a hydrogen ion conductive polymer electrolyte,
    a discontinuous catalyst layer being formed on a surface of said anode catalyst layer and having a higher density of platinum type catalyst than said anode catalyst layer which is provided at the interface between said anode catalyst layer and said polymer electrolyte membrane, and
    the ratio (Pt/C) of platinum atoms to carbon atoms on the surface of said anode catalyst layer having said discontinuous catalyst layer is 0.2 to 0.8 at the discontinuous catalyst layer side.

2. The fuel cell in accordance with claim 1, wherein said discontinuous catalyst layer comprises a plurality of catalyst islands.

3. The fuel cell in accordance with claim 1, wherein said platinum catalyst is an alloy or mixture containing platinum and at least one selected from the group consisting of ruthenium, iron, cobalt, nickel, chromium, molybdenum, rhodium, palladium, osmium and iridium.

4. The fuel cell in accordance with claim 1, further comprising an electrolyte polymer layer provided at the interface between said discontinuous catalyst layer and said polymer electrolyte membrane, wherein said electrolyte polymer layer is made of a polymer electrolyte having at least one ion conductive functional group selected from the group consisting of a phosphonyl group, a phosphinyl group, a sulfonyl group, a sulfinyl group, a carboxyl group, a sulfone group, a mercapto group, an ether bond group, a hydroxyl group, a quaternary ammonium group, an amino group and a phosphate group.

5. The fuel cell in accordance with claim 4, wherein said electrolyte polymer layer is formed by a wet application process in which a solution containing said polymer electrolyte is applied onto said discontinuous catalyst layer.

6. The fuel cell in accordance with claim 1, wherein said fuel contains at least one organic compound selected from the group consisting of methanol, dimethyl ether and ethylene glycol, and said fuel cell is a direct fuel type fuel cell.

7. A method for producing a fuel cell comprising the steps of:
    forming a catalyst layer containing at least conductive carbon particles supporting a platinum catalyst thereon and a hydrogen ion conductive polymer electrolyte;
    forming a discontinuous catalyst layer on the surface of said catalyst layer; and
    placing a hydrogen ion conductive polymer electrolyte membrane on the surface of said catalyst layer at the discontinuous catalyst layer side and hot pressing said catalyst layer and said polymer electrolyte membrane to be integrated.

8. The method for producing a fuel cell in accordance with claim 7, wherein said discontinuous catalyst layer is formed by plasma chemical-vapor deposition using an organic metal complex containing a platinum-based metal.

9. The method for producing a fuel cell in accordance with claim 8, wherein said plasma chemical-vapor deposition is performed by applying an alternating voltage only or a direct voltage with a superimposed alternating voltage to generate glow discharge plasma.

10. The method for producing a fuel cell in accordance with claim 7, wherein said discontinuous catalyst layer is formed on the surface of said catalyst layer by spraying art ink containing at least a platinum catalyst and an organic dispersion medium on the surface of said catalyst layer by means of an ink jet method or spraying method.

11. A method for producing a fuel cell comprising the steps of:
    forming a catalyst layer containing at least conductive carbon particles supporting a platinum catalyst thereon and a hydrogen ion conductive polymer electrolyte;
    forming a discontinuous catalyst layer on the surface of said catalyst layer;
    forming an electrolyte polymer layer on the surface of said catalyst layer at the discontinuous catalyst layer side by a wet application process; and
    placing a hydrogen ion conductive polymer electrolyte membrane on the surface of said electrolyte polymer layer and hot pressing said catalyst layer and said polymer electrolyte membrane to be integrated.

12. The method for producing a fuel cell in accordance with claim 11, wherein said discontinuous catalyst layer is formed by plasma chemical-vapor deposition using an organic metal complex containing a platinum-based metal.

13. The method for producing a fuel cell in accordance with claim 12, wherein said plasma chemical-vapor deposition is performed by applying an alternating voltage only or a direct voltage with a superimposed alternating voltage to generate glow discharge.

14. The method for producing a fuel cell in accordance with claim 11, wherein said discontinuous catalyst layer is formed on the surface of said catalyst layer by spraying an ink containing at least a platinum catalyst and an organic dispersion medium on the surface of said catalyst layer by means of an ink jet method or spraying method.

* * * * *

UNITED STATES PATENT AND TRADEMARK OFFICE
CERTIFICATE OF CORRECTION

PATENT NO. : 7,498,097 B2
APPLICATION NO. : 11/019031
DATED : March 3, 2009
INVENTOR(S) : Hideyuki Ueda et al.

Page 1 of 1

It is certified that error appears in the above-identified patent and that said Letters Patent is hereby corrected as shown below:

IN THE CLAIMS:

In Column 18, Line 3 (Claim 10), change "spraying art ink" to --spraying an ink--.

Signed and Sealed this

Thirtieth Day of June, 2009

JOHN DOLL
*Acting Director of the United States Patent and Trademark Office*